(12) United States Patent
Yamashita (10) Patent No.: US 7,283,366 B2
(45) Date of Patent: Oct. 16, 2007

(54) ELECTRICAL CONNECTION BOX

(75) Inventor: Hisanobu Yamashita, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 289 days.

(21) Appl. No.: 11/092,636

(22) Filed: Mar. 30, 2005

(65) Prior Publication Data

US 2005/0231896 A1 Oct. 20, 2005

(30) Foreign Application Priority Data

Apr. 19, 2004 (JP) ............................. 2004-123177

(51) Int. Cl.
*H05K 7/20* (2006.01)
(52) U.S. Cl. ................. 361/719; 361/622; 361/679; 361/704; 165/80.1
(58) Field of Classification Search .................... None
See application file for complete search history.

(56) References Cited

U.S. PATENT DOCUMENTS

| | | | | |
|---|---|---|---|---|
| 4,916,575 A | * | 4/1990 | Van Asten | .................. 361/715 |
| 6,116,916 A | * | 9/2000 | Kasai | ......................... 439/76.2 |
| 6,265,659 B1 | * | 7/2001 | Kaiser | ......................... 174/564 |
| 6,341,066 B1 | * | 1/2002 | Murowaki et al. | ........... 361/707 |
| 6,430,054 B1 | * | 8/2002 | Iwata | ........................... 361/752 |
| 6,522,528 B2 | * | 2/2003 | Yamane | ....................... 361/601 |
| 6,671,173 B2 | * | 12/2003 | Ashiya et al. | ............... 361/704 |
| 6,724,627 B2 | * | 4/2004 | Onizuka et al. | ............. 361/704 |
| 6,924,985 B2 | * | 8/2005 | Kawakita et al. | ............ 361/715 |
| 7,099,155 B2 | * | 8/2006 | Kobayashi et al. | .......... 361/719 |
| 7,154,753 B2 | * | 12/2006 | Kobayashi | ................... 361/715 |
| 2004/0001319 A1 | * | 1/2004 | Kawakita et al. | ............ 361/715 |

FOREIGN PATENT DOCUMENTS

JP  A 2003-164039  6/2003

* cited by examiner

*Primary Examiner*—Boris L. Chervinsky
(74) *Attorney, Agent, or Firm*—Oliff & Berridge, PLC (57) ABSTRACT

An electrical connection box includes a plurality of circuit components at least partially overlapped one above the other and substantially arranged in parallel. Each of the circuit components includes a substrate having a switching member and an electrical power conductive path; a supporting member that supports the circuit components; and a heat insulating member located between an upper circuit component and a lower circuit component. The heat insulating member is capable of regulating a heat transfer between the upper circuit component and the lower circuit component.

14 Claims, 8 Drawing Sheets

ELECTRICAL CONNECTION BOX

BACKGROUND OF THE INVENTION

1. Field of the Invention

The present invention relates to an electrical connection box.

2. Description of the Related Art

An electrical connection box is disclosed in JP-A-2003-164039, which includes a control circuit substrate, switching members disposed on the front surface of the control circuit substrate to be controlled by the control circuit substrate, electrical power conductive paths disposed along the front surface of the control circuit substrate to be connected to a power supply.

SUMMARY OF THE INVENTION

In the above-mentioned electrical connection box, a relatively large current flows through the electrical power conductive paths, so that the electrical power conductive path must be made so as to have a large disposing space like a wide metallic plate material. Therefore, if the number of divergent pathways or the number of electrodes of the electrical power conductive paths is increased, the control circuit substrate becomes bigger as much as the disposed space of the electrical power conductive paths becomes wider. As a result, the entire electrical connection box becomes bigger.

The present invention has been made based on the above-described situation. An object of the present invention is to provide a miniaturization of the electrical connection box.

According to one aspect of the invention, there is provided with an electrical connection box including: a plurality of circuit components at least partially overlapped and substantially arranged in parallel each circuit component including a substrate having a switching member and an electrical power conductive path; a supporting member that supports the circuit components; and a heat insulating member located between an upper circuit component and a lower circuit component and capable of regulating a heat transfer between the upper circuit component and the lower circuit component.

Since a substrate has been divided into a plurality of substrates to be overlapped, a substrate can be miniaturized, so that the miniaturization of an entire electrical connection box can be ensured. In addition, when a plurality of circuit component are disposed so as to be overlapped in a longitudinal direction, the heat generated from switching members of the lower circuit component is transferred to the upper circuit component. Accordingly, it is apprehended that the upper circuit component can be overheated. However, a heat insulating member, which is capable of regulating the heat transfer between the upper circuit component and the lower circuit component, is provided between both the circuit components, which makes it possible to prevent the upper circuit component from overheating.

According to another aspect of the invention, at least one of the circuit components is accommodated in an enclosed space. An outer wall defining the enclosed space is configured by a heat-radiating panel having a thermal conductivity.

When a printed circuit is wired on the front surface of the substrate, a short circuit is easily generated by an adhesion of water or dirt. However, any one of the circuit components is accommodated within an enclosed space, so that the short circuit can be prevented. In addition, when the circuit component is accommodated in the enclosed space, it is apprehended that the heat generated in the switching members remains in the enclosed space. However, an outer wall defining the enclosed space is configured by a heat-radiating panel having a high thermal conductivity, so that the heat within the enclosed space can be effectively radiated outside.

According to another aspect of the invention, the switching member is disposed on a front surface of the substrate. The electrical power conductive path is disposed on a rear surface of the substrate. The electrical power conductive path at least partially overlaps the heat radiating panel.

Since the heat generated in the switching member is effectively transferred to the heat-radiating panel by passing through an electrical power conductive path, the performance of radiation outside the enclosed space is excellent.

According to another aspect of the invention, the electrical power conductive path and the heat radiating panel are fixed with an adhesive layer interposed between the electrical power conductive path and the hear radiating panel.

Since the electrical power conductive path and the heat-radiating panel are adhered to each other with an adhesive layer interposed therebetween, thermal conductivity from the electrical power conductive path into the heat-radiating panel can be improved.

DESCRIPTION OF THE PREFFERD EMBODIMENTS

Embodiment 1

Hereinafter, the Embodiment 1 of the present invention will be explained by referring to FIG. 1 through FIG. 11. The electrical connection box according to the first embodiment is configured by a first circuit component 10 and a second circuit component 30 which are overlapped one above the other in a horizontal manner. The first circuit component 10 and second circuit component 30 are accommodated into a case 40 (corresponding to a supporting member).

Figure 10:
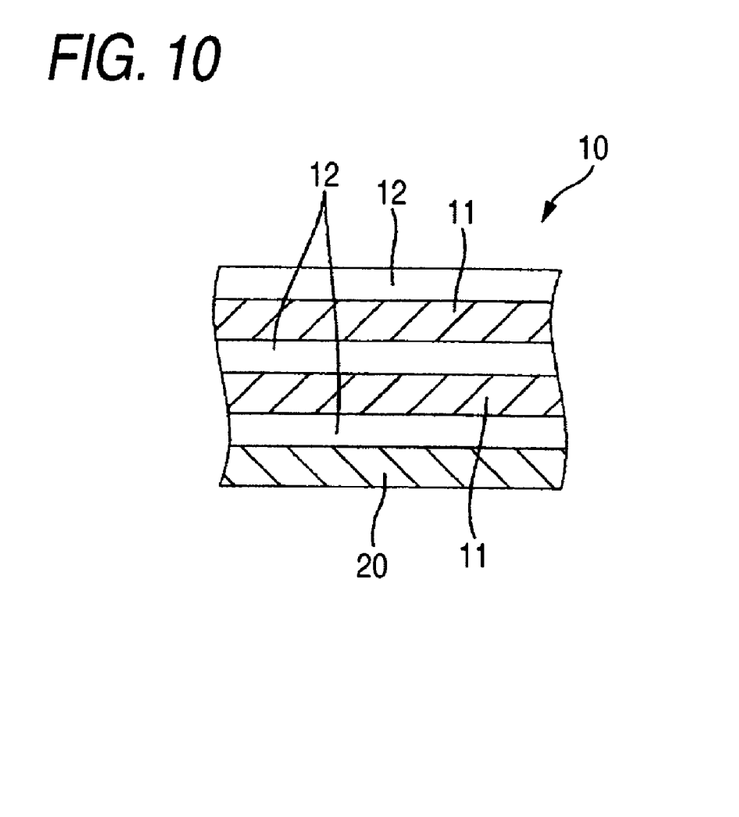
FIG. 10 is a partial expanded cross-sectional view illustrating a structure where the first circuit component is fixed to a heat-insulating panel.

The first circuit component 10 is provided with the substantially rectangular supporting substrate 11, a first electric power conducting channel 12 (corresponding to an electrical power conductive path) arrayed along the supporting substrate 11 and a relay 22 (corresponding to a switching member) attached to an upper cover 41 which will be explained later. As illustrated in FIG. 10, the supporting substrate 11 is divided into two layers above and below in the first embodiment. In addition, the first electric power conducting channel 12 is configured by a plurality of bus bars made with a thick metal sheet punched out into a predetermined shape. The first electric power conducting channel 12 are divided into three layers above and below.

The first electric power conducting channel 12 (top layer) is adhered to an upper plane (surface) of upper supporting substrate 11. The first electric power conducting channel 12 (intermediate layer) and the first electric power conducting channel 12 (bottom layer) are respectively adhered to both the upper and the lower planes (surface and back) of the lower supporting substrate 11. Plural relay terminals 13 penetrating through the supporting substrate 11 and projecting to the upper plane (surface) at an substantially right angle, plural fuse terminals 14 penetrating through the supporting substrate 11 and projecting to the upper plane (surface) at an substantially right angle and plural tuning-fork shaped terminals 15 projecting downward from the lower plane of the supporting substrate 11 at an substantially right angle, are integrally formed in the first electric power conducting channel 12.

Figure 6:
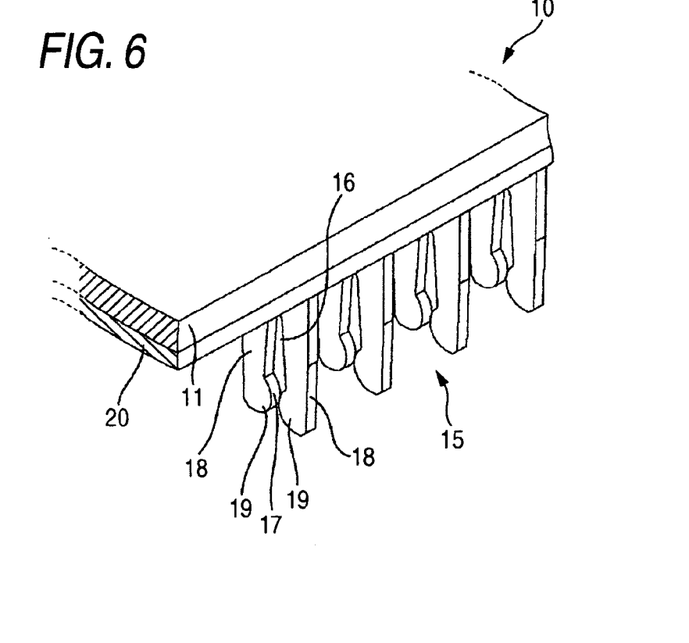
FIG. 6 is a perspective view illustrating a tuning-fork terminal section.

The tuning-fork shaped terminal 15 is in a vertically-long band plate form (tab shape) as a whole and arrayed in a line at a predetermined pitch back and forth along the left edge on the peripheral edge of the supporting substrate 11. The tuning-fork shaped terminal 15 is provided with the notch part 16 which is notched upward from the lower facing toward the longitudinal direction (in parallel in the direction that it is fitted into the tab terminal 36). A longitudinal-direction opening of this notch part 16 is made gradually wider from the top to the bottom, except for the lower end part, and made narrower at the admission part 17 on the lower end of the notch part 16. In other words, parts on both the right and the left sides of the notch part 16 at the tuning-fork shaped terminal 15 are a pair of holding strips 18 extended out downward in a cantilevered form. The side edge on the notch part 16 at the lower end part of each holding strip 18 is a guidance part 19 extended out (projected) to the opposite holding strip 18 in a circular form, and the pair of the guidance parts 19 constitute the admission part 17 of the notch part 16.

An insulating plate 20 formed by a plate covering a supporting substrate 11 (corresponding to a heat insulating member), is adhered to the lower plane of the supporting substrate 11, or the lower plane of the first electric power conducting channel 12 (bottom layer) in a state of being closely overlapped by an adhesive agent (not illustrated here). This insulating plate 20 regulates heat conduction between the upper first circuit component 10 and the lower second circuit component 30. The insulating plate 20 is made with materials lower in heat conductivity, for example, synthetic resins mainly composed of high-polymer materials such as polyethylene. The insulating plate 20 is also electrically insulative. The insulating plate 20 is also provided with plural through-holes 21, through which the tuning-fork shaped terminals 15 penetrate. A displacement of the tuning-fork shaped terminals 15 is horizontally regulated. The tuning-fork shaped terminals 15 project downward from the insulating plate 20.

Figure 11:
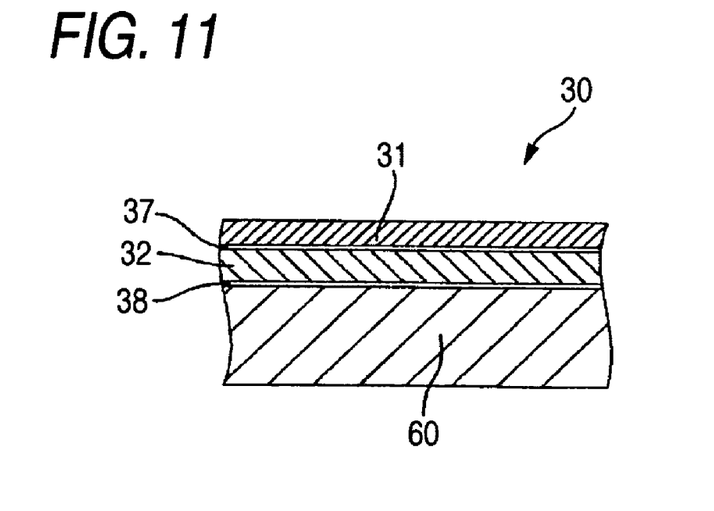
FIG. 11 is a partial expanded cross-sectional view illustrating a structure where the second circuit component is fixed to a heat-radiating panel.

The second circuit component 30 is provided with a control circuit substrate 31 substantially formed in a rectangular shape, a second electric power conducting channel 32 (corresponding to the electric power conducting path) arrayed along the lower plane of the control circuit substrate 31 and a semiconductor switching element 33 (corresponding to a switching member) projected on the upper plane (surface) of the control circuit substrate 31. The second electric power conducting channel 32 includes plural bus bars made with a thick metal sheet punched out into a predetermined shape. As illustrated in FIG. 11, The second electric power conducting channel 32 is closely adhered to a lower plane of the control circuit substrate 31 through an adhesive agent or a thin adhesive sheet 37. The adhesive agent and adhesive sheet are electrically insulative and have high heat conductivity. Plural relay terminal 34 projecting at an substantially right angle to the upper plane (surface) along the front edge and the left edge on the peripheral edge of the control circuit substrate 31, plural fuse terminals 35 projecting at an substantially right angle to the upper plane (surface) along the back edge on the peripheral edge of the control circuit substrate 31 and plural tab terminals 36 projecting at an substantially right angle to the upper plane (surface) along the left edge on the peripheral edge of the control circuit substrate 31 are integrally formed the second electric power conducting channel 32.

Figure 8:
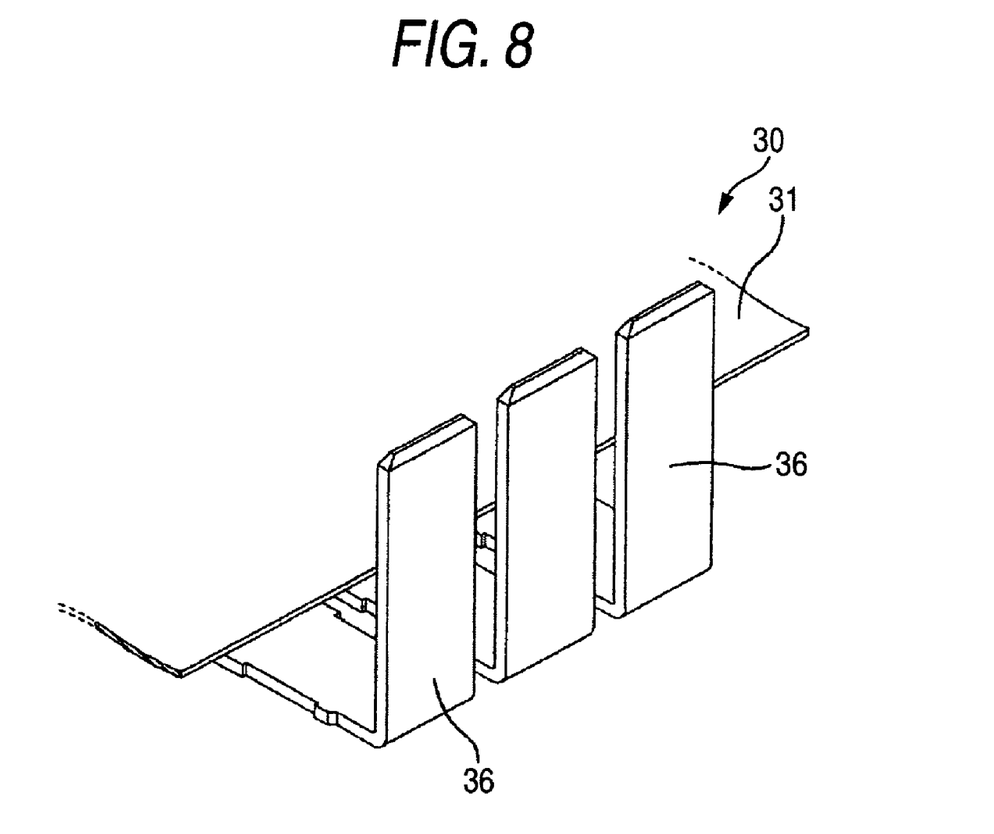
FIG. 8 is a perspective view illustrating a tab terminal section.

The tab terminal 36 is in a vertically-long band plate form (tab shape) and arrayed in a line at a predetermined pitch back and forth along the left edge on the peripheral edge of the control circuit substrate 31, so that the arrayed tab terminal 36 is corresponding to the tuning-fork shaped terminal 15. The upper edge of the tab terminal 36 faces the back and forth direction so as to give a right angle to the lower edge of the tuning-fork shaped terminal 15. Further, the thickness of the tab terminal 36 is to be equal to or slightly larger than an opening width (namely, a pitch between the guidance parts 19 of the holding strip 18) of the admission part 17 at the notch part 16 of the tuning-fork shaped terminal 15.

The case 40 is configured by an upper cover 41, a frame 48 and a radiator plate 60. The upper cover 41 is made with a synthetic resin. The upper cover includes a substantially rectangular encircling wall 42 which encircles circumference of the first circuit component 10 and the second circuit component 30 and the upper plane plate 43 which covers the first circuit component 10 from the top, with the inner space of the upper cover 41 opened downward. The upper plane plate 43 is provided with plural relay fixing parts 44 which are formed in a rectangular tubular form and pointed upward. The relays 22 which are formed in a block are individually fitted into the relay fixing parts 44 in a detachable manner. In addition, the relay terminal 13 of the first electric power conducting channel 12 and the relay terminal 34 of the second electric power conducting channel 32 approach inside the relay fixing part 44, penetrating the through-hole 44H at the bottom, and the relays 22 attached to the relay fixing part 44 are connected to the relay terminals 13 and 34.

Figure 1:
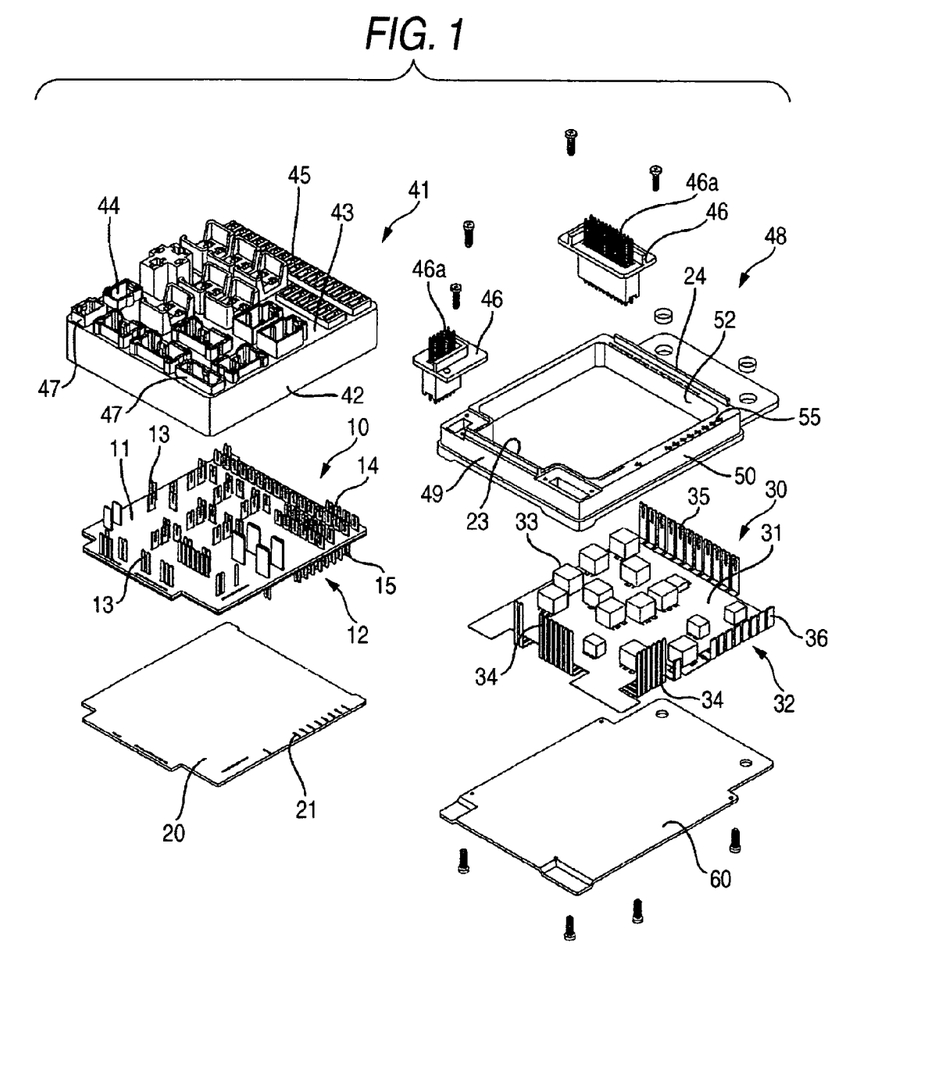
FIG. 1 is an exploded perspective view.
Figure 2:
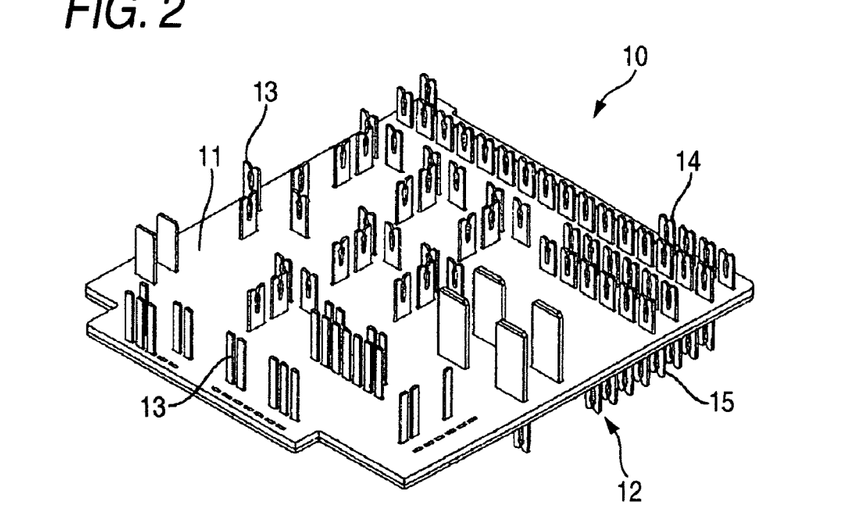
FIG. 2 is a perspective view of a first circuit component.
Figure 3:
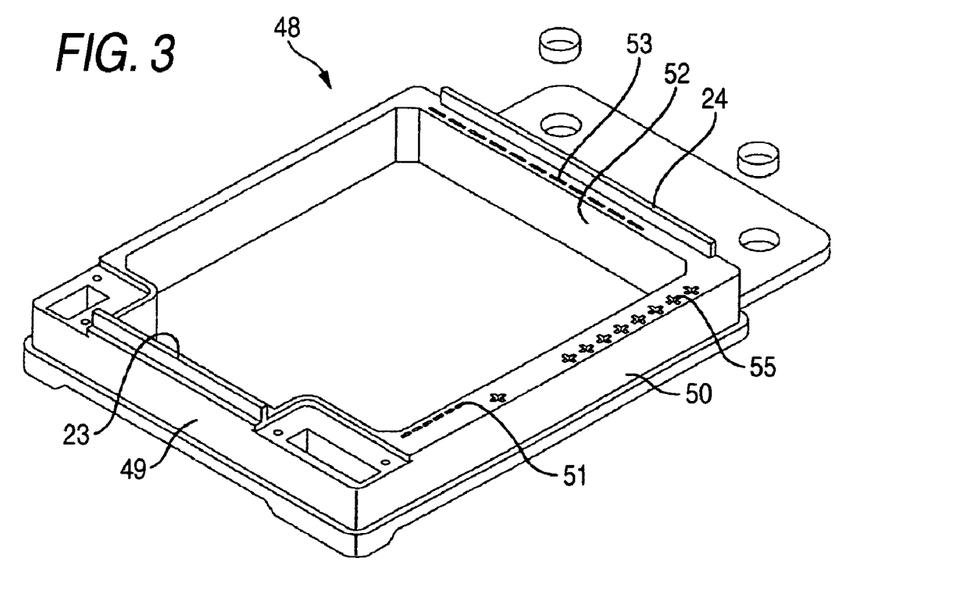
FIG. 3 is a perspective view of a frame of a case.
Figure 4:
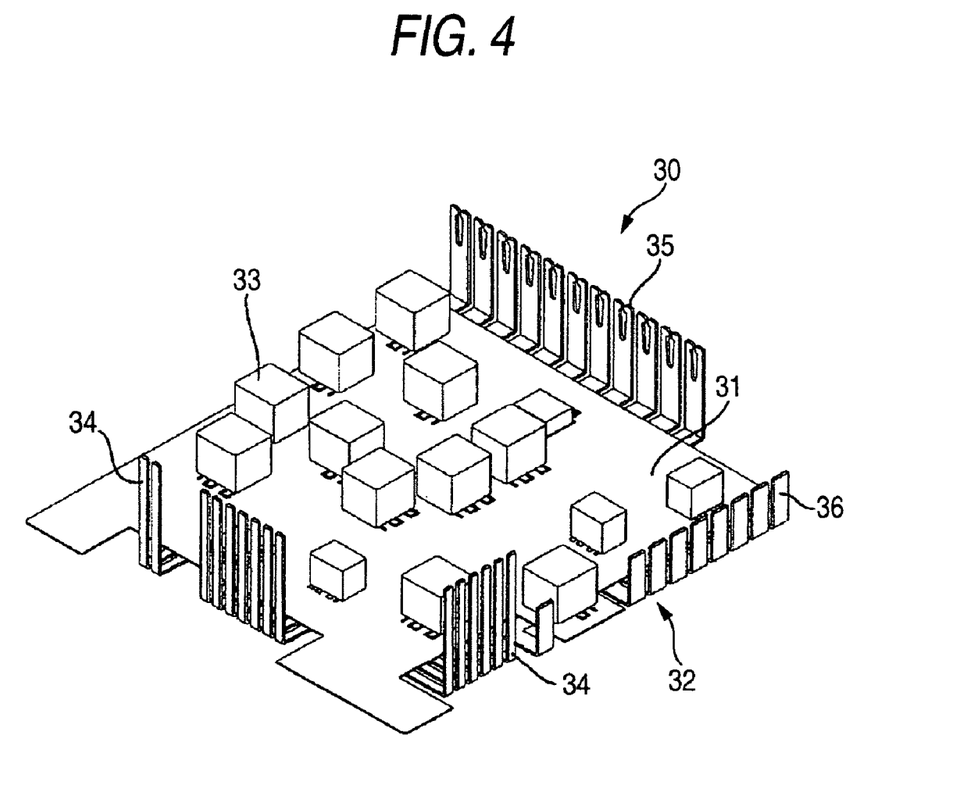
FIG. 4 is a perspective view of a second circuit component.
Figure 5:
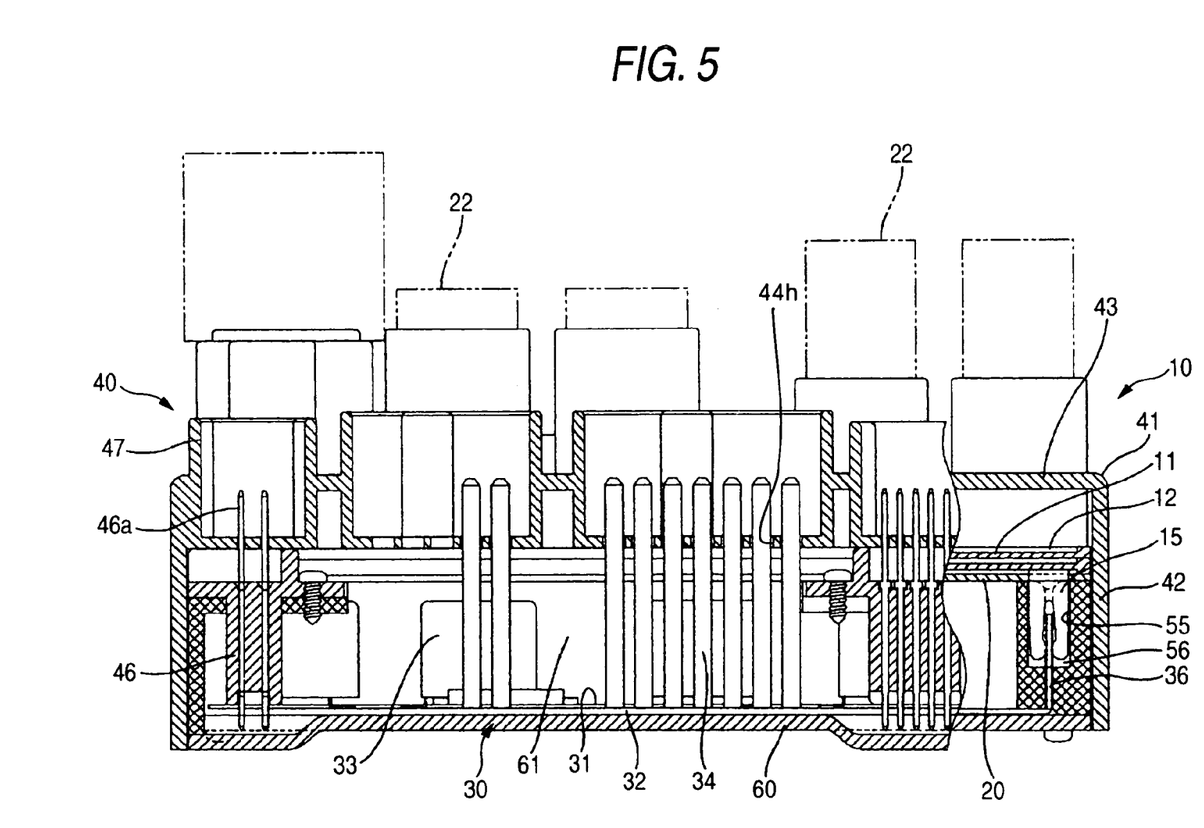
FIG. 5 is a cross-sectional view.

The frame 48 is made with a synthetic resin. The frame 48 has a substantially rectangular form. The frame 48 encircles the circumference of the second circuit component 30, with both the upper and lower planes opened (vertically penetrated structure). Of frame parts in all directions constituting the frame 48, a front edge frame part 49 and a left edge frame part 50 of the frame 48 are provided with through-holes 51 that allows relay terminals 34 of the second circuit component 30 to penetrate in a case where the relay terminals are positioned individually and fixed without rattle. Further, a back edge frame part 52 of the frame 48 is provided with through-holes 53 that allows fuse terminals 35 of the second circuit component 30 to penetrate.

The front edge frame part 49 of the frame 48 is provided with the positioning rib 23 for regulating a relative deflection of the frame 48 toward the front of the first circuit component 10 by allowing the supporting substrate 11 of the first circuit component 10 to contact from the back. Further, the back edge frame part 52 of the frame 48 is provided with the positioning rib 24 for regulating a relative deflection of the frame 48 toward the back and the right or left direction of the first circuit component 10 by allowing the supporting substrate 11 of the first circuit component 10 to contact from the front as well as from both the right and left directions.

Figure 7:
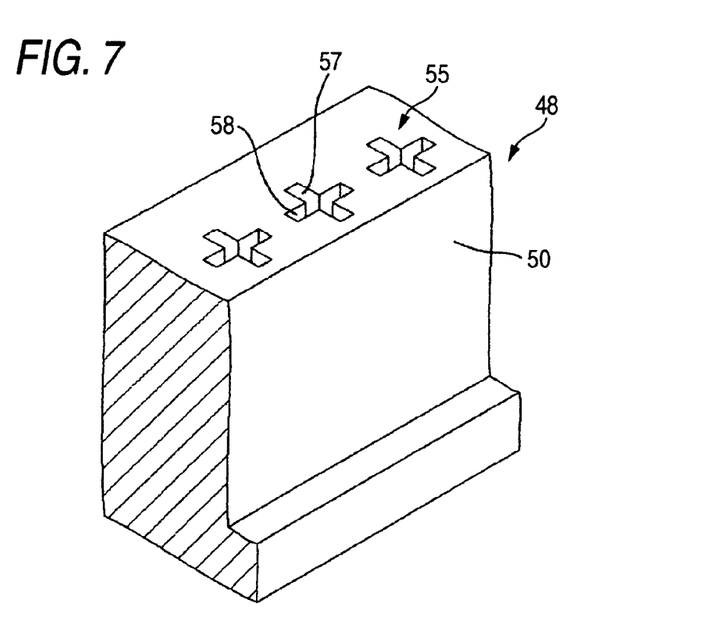
FIG. 7 is a perspective view illustrating a positioning section.

The left edge frame part 50 of the frame 48 is provided with plural positioning parts 55 that accommodates the tab terminal 36 and the tuning-fork shaped terminal 15. These positioning parts 55 are in a hole shape of penetrating through the right edge frame part 50 vertically or in parallel with the direction that the tuning-fork shaped terminal 15 is fitted into the tab terminal 36, and an inner part of each positioning part 55 is an accommodating space 56. The accommodating space 56 of each positioning part 55 is connected in a non-communicative manner with the accommodating space 56 of other positioning spaces 55, and the accommodating spaces 56 adjacent in the back and forth direction are, therefore, partitioned by a wall of the right edge frame part 50.

Figure 9:
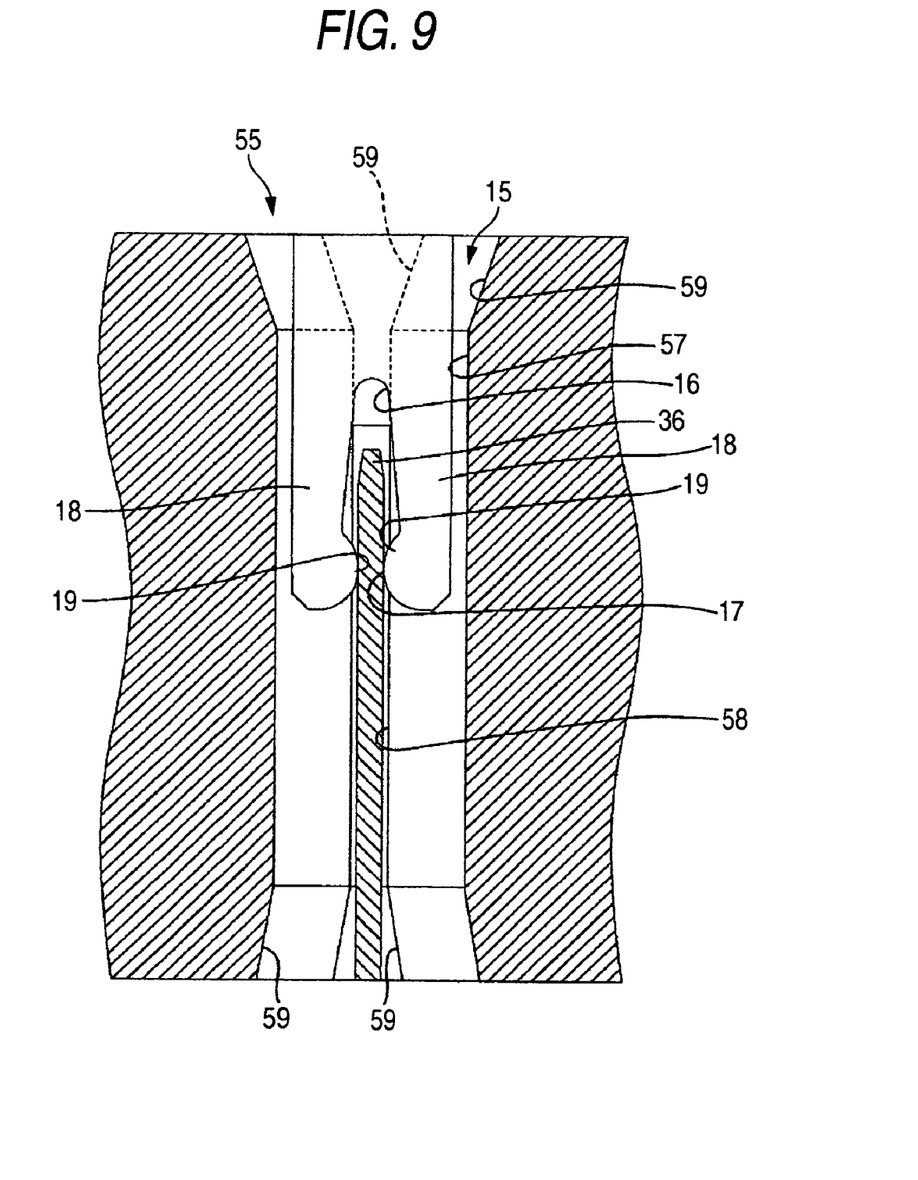
FIG. 9 is an expanded cross-sectional view illustrating a state where the tuning-fork terminal section and the tab terminal section fit with each other.

These accommodating spaces 56 are individually available in a cross-like figure, when viewed from the direction that the terminal 15 is fitted into the terminal 36, in other words, the first space 57 formed in a slit shape in the back and forth direction and the second space 58 formed in a slit shape in the longitudinal direction are intersected in an approximately right angle. Of these accommodating spaces 56, the tuning-fork shaped terminal 15 is fitted from above into the first space 57 formed in the longitudinal direction, and the thus fitted tuning-fork shaped terminal 15 is regulated for the deflection made in the back and forth direction or in the longitudinal direction in relation to the frame 48 by contacting with the inner wall of the first space 57, and the notch part 16 of the tuning-fork shaped terminal 15 corresponds with the space in the back and forth direction. Further, the tab terminal 36 is fitted from below into the second space 58 in the back and forth direction in the accommodating space 56, and the thus fitted tab terminal 36 is regulated for the deflection made in the back and forth direction or in the longitudinal direction in relation to the frame 48 by contacting with the inner wall of the second space 58. Inside the accommodating space 56 (positioning part 55), the upper end part of the tab terminal 36 is closely fitted into the notch part 16 of the tuning-fork shaped terminal, by which the first electric power conducting channel 12 and the second electric power conducting channel 32 are communicatively connected.

A taper-shaped guiding plane 59 is formed on opening edges of upper and lower ends of the accommodating space 56. Thus, even if the terminals 15 and 36 are placed into the accommodating space 56 at a slightly deviated position when the tuning-fork shaped terminal 15 and the tab terminal 36 are fitted into the accommodating space 56, the terminals 15 and 36 make contact with the guiding plane 59, by which the deviated position of the terminals 15 and 36 in the frame 48 can be corrected and the terminals 15 and 36 are guided into the accommodating space 56 without fail.

The wire harness connector 46 is fixed from above to the both right and left ends of the front edge frame part 49 of the frame 48, and the lower end part of the terminal fitting 46a of the connector 46 is connected to the control circuit substrate 31 of the second circuit component 30. The upper end part of the terminal fitting 46a of the connector 46 approaches into the tubular fitting part 47 of the upper cover 41 in preparation for connecting with the wire harness connector (not illustrated) and the terminal fitting (not illustrated).

The radiator plate 60 is made with an substantially rectangular metal plate (for example, aluminum), completely closing an opening on the lower part of the frame 48. As illustrated in FIG. 11, the radiator plate 60 is electrically insulative to the lower plane of the second electric power conducting channel 32 of the second circuit component 30 and adhered so as to contact with the plane through an adhesive agent or a thin adhesive sheet 38 high in heat conductivity and in close proximity thereto. Thus, heat generated at the semiconductor switching element 33 when electricity is distributed to the second electric power conducting channel 32 is effectively conducted to the radiator plate 60 through the adhesive agent or adhesive sheets 37 and 38 and the second electric power conducting channel 32 and released outside (downward) the case 40.

The lower plane of the frame 48 is adhered to the upper plane of the radiator plate 60 through a water-proof seal layer (not illustrated here) in a state where the case 40 is assembled and the second circuit component 30 (including the switching element 33) is accommodated into the sealed space 61 constituted with the frame 48 and the radiator plate 60. Then, the peripheral edge part of the insulating plate 20 of the first circuit component 10 is placed on the upper plane of the frame 48 (sealed space 61), by which the second circuit component 30 inside the sealed space 61 or the sealed space 61 can be protected from water, dust and others coming outside.

The first circuit component 10 is positioned by the positioning ribs 23 and 24 in such a way that a relative deflection toward the back and forth direction or the right and left direction is regulated. The above placement and the positioning structure make it possible that the supporting substrate 11 of the first circuit component 10 is overlapped one above the other with the control circuit substrate 31 of the second circuit component 30 at a predetermined space and mutually in a parallel form, interference of the switching element 33 with the supporting substrate 11 (insulating plate 20) is avoided and the tuning-fork shaped terminal 15 is connected to the tab terminal 36 at a normal position.

As explained above, in this embodiment, the first circuit component 10 in which the supporting substrate 11 is provided with the relay 22 and the first electric power conducting channel 12 and the second circuit component 30 in which the control circuit substrate 31 is provided with the second electric power conducting channel 32 and the switching element 33 are kept by the frame 48 of the case 40 so that they can be overlapped one above the other and mutually in a parallel form. A substrate is divided into plural pieces to be overlapped one above the other, and one sheet of the substrate (supporting substrate 11 and control circuit substrate 31) can be made smaller (smaller in area), thus making it possible to reduce a whole dimension of the electric connection box. Further, the supporting substrate 11 and the control circuit substrate 31 are kept mutually in an substantially parallel form and at a predetermined space, by which the electric power conducting channel 12 and the electric power conducting channel 32 can be connected stably with their respective counterparts.

Where these two circuit components 10 and 30 are arrayed in a mutually overlapping manner, there is a concern that heat generated at the semiconductor switching element 33 of the lower second circuit component 30 is conducted to the upper first circuit component 10, thus resulting in an overheated condition at the first circuit component 10. In this embodiment, however, since the insulating plate 20 capable of preventing heat conduction between the first circuit component 10 and the second circuit component 30 is provided between these circuit components, there will be no overheat at the upper first circuit component 10.

When a water and a dust etc. are adhered to a surface of the control circuit substrate 32 of the second circuit component 30, circuit short will occur. Since the printed circuit is arranged on the surface of the control circuit substrate 32 of the second circuit component 30 located at lower side. However, in the first embodiment of the invention, the circuit-short can be prevented, since the second circuit component 30 is accommodated within the sealed space 61. Further, when the second circuit component 30 is accommodated within the sealed space 61, a heat generated by semiconductor switching elements 33 is trapped with the sealed space 61. However, in the first embodiment of the invention, a outer wall (lower face wall) of the case 40 that configures the sealed space is configured by the heat-radiating panel 60 having a high heat conductivity, so that the heat trapped within the sealed space 61 is effectively released outside.

The semiconductor switching element 33 is disposed on the surface of the control circuit substrate 31, while the second electric power conducting channel 32 is overlapped to be face with each other. Thus, a heat generated by the semiconductor switching element 33 is effectively conducted toward the head-radiating panel thorough the second electric power conducting channel 32. The ability of heat-radiating is high. Further, the second electric power conducting channel 32 and the heat-radiating panel 60 are closely contact with each other through the adhesive agent or adhesive sheets 37, 38, so that a heat-radiating ability can be further enhanced.

According to the first embodiment of the invention, when the electric power conducting channel 12 is electrically connected with the channel 32, the tuning-fork shaped terminal 15 is provided on the upper first electric power conducting channel 12 to be electrically connected. The tab terminal 36 is also provided on the lower second electric power conducting channel 32, and the positioning part 55 for positioning the two terminals 15 and 36 at a normal connecting site is provided on the frame 48. Therefore, since the frame 48 acts as a means of positioning the terminals 15 and 36, the structure can be simplified as compared with a case where a special positioning means is provided in addition to the frame 48.

The tuning-fork shaped terminal 15 and the tab terminal 36, which connects the electric power conducting channels 12 and 32, are provided so as to be adjacent to each other in a plural number. Plural tuning-fork shaped terminals 15 are individually accommodated into plural accommodating spaces 56 made in the frame 48, and plural tab terminals 36 are also individually accommodated into plural accommodating spaces 56, thereby making it possible to prevent short-circuits between the tuning-fork shaped terminals 15 and also short-circuits between adjacent tab terminals 36.

In the first embodiment of the invention, the first circuit component 10 in which the first electric power conducting channel 12 is arrayed along the supporting substrate 11 and the second circuit component 30 in which the second circuit component 30 is arrayed along the control circuit substrate 31 are overlapped one above the other and mutually in an substantially parallel form and accommodated into the case 40, and the tuning-fork shaped terminals 15 of the first electric power conducting channel 12 are fitted into the tab terminals 36 of the second electric power conducting channel 32 one above the other so that they can be connected. Further, the frame 48 of the case 40 is provided with the positioning part 55 for regulating deflection of the terminals 15 and 36 on both the first and second circuit components toward the direction (back and forth or right and left direction) intersecting in the vertical direction (direction that the terminals 15 and the terminals 36 are fitted into their respective counterparts). Such provision of the positioning part 55 makes it possible to give positioning to plural tuning-fork shaped terminals 15 and plural tab terminals 36 all together and also to fit plural tuning-fork shaped terminals 15 into plural tab terminals 36 at the same time (all together). Further, the positioning part 55 is provided in the case 40 for accommodating the circuit components 10 and 30, thereby eliminating the necessity for the special positioning member 55.

In addition, both of the tuning-fork shaped terminal 15 and the tab terminal 36 are in a plate form (tab shape), and the tab terminal 36 is fitted into the notch part 16 formed on the tuning-fork shaped terminal 15 so that these terminals can be connected. The respective terminals 15 and 36 are available in a plate form and, therefore, simplified in structure. Further, one of the terminals (tuning-fork shaped terminal 15) is provided with the notch part 16, into which another terminal (tab terminal 36) is fitted, thereby resulting in a simplified structure where the terminals 15 and 36 are fitted respectively into their counterparts.

A plurality of the tuning-fork shaped terminals 15 and a plurality of the tab terminals 36 are adjacently arrayed in a line in the back and forth direction. In this embodiment, a wall partitioning each hole-like space 56 constituting the positioning part 55 is structured to exist between the terminals, thus making it possible to avoid short-circuits between the terminals, without providing a special short-circuit preventive means. Further, short-circuits between the terminals can be prevented more assuredly because a part at which the tuning-fork shaped terminal 15 is fitted into the tab terminal 36 is accommodated into the hole-like space 56 of the positioning part 55.

Other Embodiments

The present invention shall not be restricted to the embodiment described with reference to the above description and figures, but, for example, includes the following embodiments in the technical field of the invention. In addition, the invention can be executed in various modifications other than the examples shown below without deviating from the scope of the present invention.

(1) In the above-described embodiment, the frame as the supporting member is provided in the case. However, according to the embodiment of the present invention, a dedicated supporting member may be provided therein, aside from the frame.

(2) In the above-described embodiment, the positioning section is provided on the frame, which positions the terminal section of the electrical power conductive path in the upper side and the terminal section of the electrical power conductive path in the lower side. However, according to the embodiments of the present invention, the positioning section may be provided separately from the frame.

(3) In the above-described embodiment, the terminal section is configured so as to be connected inside the frame. However, the terminal section may be configured so as to be connected outside the frame.

(4) In the above-described embodiment, both the upper and lower terminal sections are made as a male (plate-shaped). However, the present invention is not limited thereto, but can also be applied to various fitting forms such as a form in which one terminal section is made as a male shape and the other is made as a female and a form in which one terminal section is made in a round-pin shape and the other is made in a cylindrical shape.

(5) In the above-described embodiment, both the upper and lower terminal sections are integrated with the electrical power conductive paths. However, the terminal section may be part separated from the electrical power conductive path.

(6) In the above-described embodiment, a notched portion is formed only in one terminal section. However, notched portions may be formed in both the upper and lower terminal sections.

(7) In the above-described embodiment, the notched portion extends parallel to the direction of fitting both the terminal sections to each other. However, the notched portion and the terminal section, in which the notched portion is form, may be substantially orthogonal to the direction of fitting both the terminal sections to each other.

(8) In the above-described embodiment, both the upper and lower terminal sections is positioned up and down. However, only one of the terminal sections parallel to each other may be positioned.

(9) In the above-described embodiment, the positioning section is provided in the frame surrounding the lower circuit component. However, the positioning section may be provided in an upper cover surrounding upper circuit component.

(10) In the above-described embodiment, the positioning section is defined as a through-hole shaped space. However, the positioning portion may be made in various shapes such as a wall, ribs, projections and the like.

(11) In the above-described embodiment, the upper circuit component uses relays serving as the switching means and the lower circuit component uses the semiconductor switching element serving as the switching means. However, the embodiments may be applied to one electrical connection box in which the upper circuit component uses the semiconductor switching element and the lower circuit component uses the relays, another electrical connection box in which both the circuit components use the relay together, and still another electrical connection box in which both the circuit components use the semiconductor switching elements together.

(12) In the above-described embodiment, the case has been described, in which the number of the circuit components is two. However, the embodiment of the present invention can also be applied to an electrical connection box in which three or more circuit components overlap. In this case, an extra circuit component may be disposed so as to be interposed between the two circuit components in which the terminal sections are fitted.

(13) In the above-described embodiment, the terminal sections is disposed along the periphery of the substrate. However, the terminal sections may be disposed in the region other than the periphery of the substrate (the center of the substrate). In this case when the electrical power conductive path and the terminal section face each other with the substrate interposed therebetween, the terminal section may pass through the substrate and may also extend from the periphery of the substrate to the center thereof. In addition, the case may be provided with a bridging section connecting the outer frames and the bridging section may be provided with the positioning section.

(14) In the above-described embodiment, both the first space and the second space of the positioning section vertically pass through the case over the entire region. However, the embodiments of the present invention may be made in a one-side-closed form in which the first space, where the tuning-fork terminal section is intruded from above, is opened only in the upper surface side or in which the second space, where the tab terminal section is intruded from below, is opened only in the lower surface side.

(15) In the above-described embodiment, the accommodating space, which accommodates the tuning-fork terminal section and the tab terminal section, also serves as the positioning sections, which position both the terminal sections. However, the accommodating space may not have a positioning function.

(16) In the above-described embodiment, only the lower circuit component between two upper and lower circuit components has been accommodated within the enclosed space. However, two circuit components parallel to each other (all the circuit components when the number of the circuit components is equal to or more than three) may be accommodated individually within the enclosed space.

(17) In the above-described embodiment, the heat insulating member has been fixed to the rear surface of the substrate of the upper circuit component. However, the heat insulating member may be spaced separately from the substrate.

(18) In the above-described embodiment, the electrical power conductive paths within the enclosed space overlap the heat-radiating panel so as to face each other. However, the electrical power conductive paths may be spaced separately from the heat-radiating panel.

(19) In the above-described embodiment, both the circuit components parallel to each other have been provided with the switching members disposed in the upper surface of the substrate. However, the switching members may be disposed in the lower surface.

(20) In the above-described embodiment, only the lower surface wall of the enclosed space has been configured by the heat-radiating panel. However, the portion corresponding to the frame may be configured by the heat-radiating panel.

(21) In the above-described embodiment, the narrow-pitch portion on the substrate may be coated with a moisture-proof agent and, further, a potting agent may be injected on the substrate.

(22) In the above embodiments, the substrates 11, 31 may be configured by a printed circuit board.

(23) In the above embodiments, the radiator plate 60 may be a heat radiating panel, a heat spreadder panel, and a heat transfer panel in the embodiments of the invention.

What is claimed is:
1. An electrical connection box comprising:
a plurality of circuit components at least partially overlapped one above the other and substantially arranged in parallel; each circuit component including a substrate having a switching member and an electrical power conductive path;
a supporting member that supports the circuit components; and
a heat insulating member located between an upper circuit component and a lower circuit component and capable of regulating a heat transfer between the upper circuit component and the lower circuit component;
wherein the switching member and the electrical power conductive path are on opposite surfaces of the substrate of at least one circuit component.

2. The electrical connection box according to claim 1, wherein at least one of the circuit components is accommodated in an enclosed space, and wherein an outer wall defining the enclosed space is configured by a radiator panel having a thermal conductivity.

3. The electrical connection box according to claim 2, wherein the radiator panel is a heat radiating panel.

4. The electrical connection box according to claim 2, wherein the radiator panel is a heat spreader panel.

5. The electrical connection box according to claim 2, wherein the radiator panel is a heat transfer panel.

6. The electrical connection box according to claim 2, wherein the electrical power conductive path and the heat radiator panel are fixed with an adhesive layer interposed between the electrical power conductive path and the radiator panel.

7. The electrical connection box according to claim 1, wherein the substrate is configured by a printed circuit board.

8. The electrical connection box according to claim 1, wherein the substrate is a control circuit substrate, wherein the switching member is disposed on a front surface of the control circuit substrate of the at least one circuit component, and wherein the electrical power conductive path is disposed on a rear surface of the control circuit substrate of the at least one circuit component.

9. An electrical connection box comprising:

a plurality of circuit components at least partially overlapped one above the other and substantially arranged in parallel; each circuit component including a substrate having a switching member and an electrical power conductive path;

a supporting member that supports the circuit components; and a heat insulating member located between an upper circuit component and a lower circuit component and capable of regulating a heat transfer between the upper circuit component and the lower circuit component;

wherein at least one of the circuit components is accommodated in an enclosed space, wherein an outer wall defining the enclosed space is configured by a radiator panel having a thermal conductivity, wherein the switching member is disposed on a front surface of the substrate, wherein the electrical power conductive path is disposed on a rear surface of the substrate, and wherein the electrical power conductive path at least partially overlaps the radiator panel to be faced.

10. The electrical connection box according to claim 9, wherein the electrical power conductive path and the heat radiator panel are fixed with an adhesive layer interposed between the electrical power conductive path and the radiator panel.

11. The electrical connection box according to claim 9, wherein the radiator panel is a heat radiating panel.

12. The electrical connection box according to claim 9, wherein the radiator panel is a heat spreader panel.

13. The electrical connection box according to claim 9, wherein the radiator panel is a heat transfer panel.

14. The electrical connection box according to claim 9, wherein the substrate is configured by a printed circuit board.

* * * * *